Figure 1:
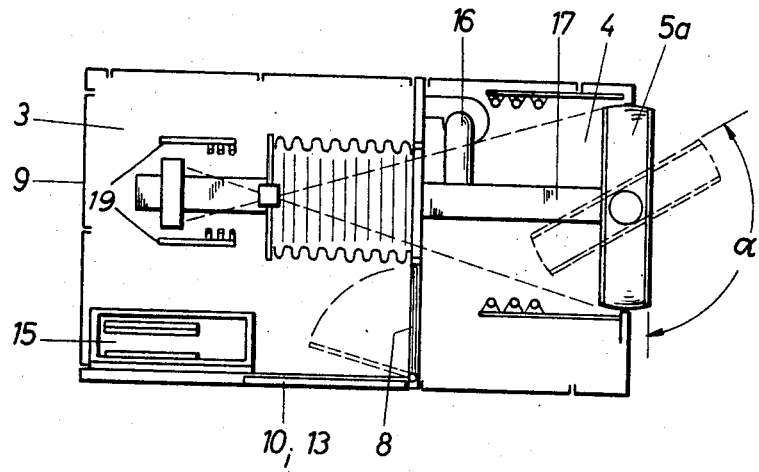

United States Patent
Grimm

[15] 3,682,545
[45] Aug. 8, 1972

[54] REPRODUCING CAMERA

[72] Inventor: Gerhard Grimm, Munich, Germany

[73] Assignee: Fritz Geisenberger, Munich, Germany

[22] Filed: May 19, 1970

[21] Appl. No.: 38,698

[30] Foreign Application Priority Data

May 23, 1969 Germany..........P 14 26 543.1

[52] U.S. Cl. .................355/18, 355/67, 355/73, 355/76
[51] Int. Cl. ...........................................G03b 27/32
[58] Field of Search.........355/27, 72, 73, 130, 60, 67

[56] References Cited

UNITED STATES PATENTS

| | | |
|---|---|---|
| 3,269,266 | 8/1966 | Polland.....................355/72 |
| 2,846,920 | 8/1958 | Friedel.....................355/72 |
| 3,464,768 | 9/1969 | Florsheim, Jr. et al......355/73 |
| 3,308,714 | 3/1967 | Friedel.....................355/73 |
| 1,821,129 | 9/1931 | Weisker..................355/60 X |
| 3,101,024 | 8/1963 | Huebner.................355/67 X |
| 3,115,058 | 12/1963 | Wally, Jr. ...................355/60 |

*Primary Examiner*—Samuel S. Matthews
*Assistant Examiner*—Richard A. Wintercorn
*Attorney*—Oberlin, Maky, Donnelly & Renner

[57] ABSTRACT

A photographic installation for microfilming large documents has two rooms accessible by an operator and interconnected by a door. The camera comprises a document holder, a lens and a photographic plate or film holder and the other the document holder but in accordance with the invention, the functions of these two holders can be reversed so that the installation can be used for re-enlarging microfilmed documents.

5 Claims, 2 Drawing Figures

REPRODUCING CAMERA

The invention relates to a photocopying apparatus of the kind with a lens which is arranged between the holder for the material which is to be copied, and the emulsion-carrier holder, and with a camera box which encloses the light beam between lens and emulsion carrier and which comprises a cabin which can be entered by at least one operator (U.S. Pat. No. 3,207,030). The emulsion-carrier cabin, in addition to containing the emulsion-carrier material, also suitably contains a small continuous developer, so that after the photograph has been taken, the emulsion carrier leaves the cabin ready-developed.

By means of a photocopying apparatus of this type, it is possible, for example, to photocopy a technical drawing on a transparent emulsion carrier on a reduced scale, and then to duplicate it in the conventional photo-printing process. In this way it is possible to put on record large-format drawings, in formats which are small and yet legible, and this brings about great saving of record space in comparison to the storing of drawings in their original format, which has been customary up till now.

However, for purposes of reproduction for construction purposes and in order to make alterations on the drawings, it is necessary to return the reduced-scale drawings back to their original format. It is an object of the invention to enable this to be carried out using the same photocopying apparatus.

According to the invention the photocopying apparatus comprises a cabin structure forming first and second cabins into which an operator can enter; a first material holder and first illuminating means for selectively illuminating material on the first holder, the first material holder and the first illuminating means being disposed in the first cabin; and a second material holder, lens means at a position intermediate between the second material holder and the first material holder, and second illuminating means for selectively illuminating material on the second holder, the second material holder, the lens means and the second illuminating means being disposed in the second cabin. With this photocopying apparatus, reduced-scale copies are made in the conventional manner, with the second of the above cabins as the darkroom. If, however, it is desired to make re-enlargements using the same apparatus whose optical axis, obviously, for this purpose, must extend horizontally in its entirety, then due to the reversal of the optical system, the original copy-holder becomes the emulsion-carrier holder, and the original emulsion-carrier holder becomes the copy-holder, with an additional illuminating device. In this case, the first cabin constitutes the darkroom.

Furthermore, it is advantageous for the partition wall between the emulsion-carrier cabin and the copy-holder cabin to have a connecting door. By this means, the exposed re-enlargement can be brought to the developing apparatus, inside the darkened cabins, without any special casings having to be provided for this purpose, such as are necessary when the emulsion carrier is being conveyed through lighted rooms.

In order to enable the photocopying apparatus according to the invention to be used, on the one hand, in comparatively small office rooms, and, on the other hand, to enable it to be operated by several persons, in a particularly advantageous form of the invention, the cabins comprise several similar wall elements which are connected together at their sides by detachable connecting elements. This gives the possibility of subsequently altering the size and also the general shape of the installation, and of adapting it to suit changing working requirements.

An increase in the output of the installation can be achieved if the holder in the first cabin is arranged pivotably or slidably, in such manner that the material holding surface of that holder is also capable of being loaded with material from outside the cabin. Here the advantage resides in the fact that the large-surfaced drawings, which are difficult to handle, can always be moved within the normally lighted office room, and the operator cannot be dazzled by the illuminating device; whilst a second operator works only in the emulsion carrier cabin, i.e., in a special kind of light.

However, a person constantly working inside the closed emulsion carrier cabin requires a supply of fresh air, since malodorous vapors may be produced from the developer fluid. For this purpose, the air which is sucked away from the copy holder, which is desirably constructed as a suction wall, is conveyed at least partially into the emulsion-carrier cabin.

Finally, the photocopying apparatus according to the invention can be further improved by providing the cabin walls with windows which have a light-filtering effect. This enables for example, a simple inspection of the emulsion-carrier cabin from the outside, before unauthorized opening of the access-door and perhaps harming of the emulsion carrier (which may be exposed), by light falling thereon.

In the accompanying drawing there is illustrated a preferred embodiment of photocopying apparatus according to the invention, shown diagrammatically by way of an example.

Figure 2:
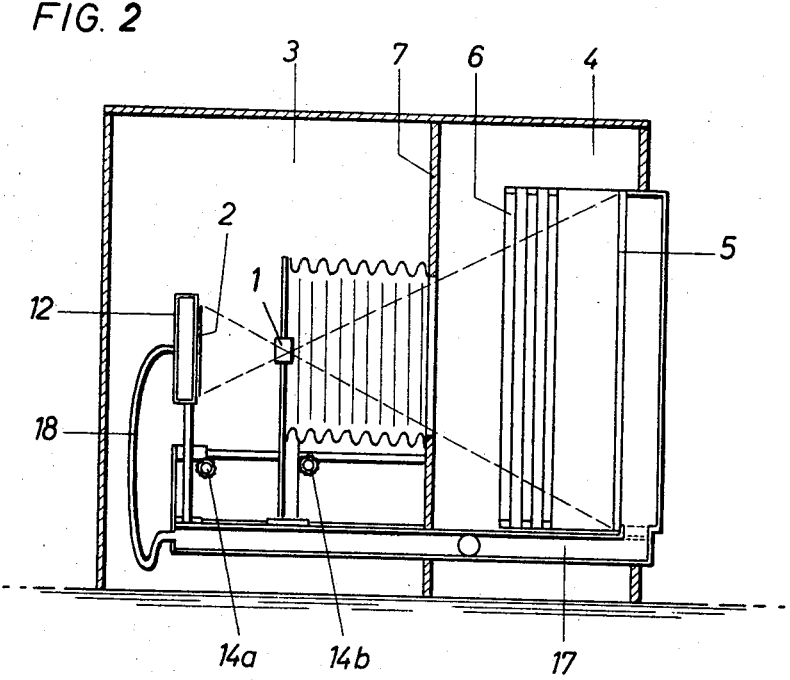

IN THE DRAWING:

FIG. 1 is a plan view of the apparatus, in cross-section, with a pivotable copy-holder; and FIG. 2 is a section side view of the apparatus according to FIG. 1.

The photocopying apparatus shown in FIG. 1 and 2 is suitable not only for reproducing copy on a reduced scale, but also for enlarging copy. By means of a partition wall 7, two cabins 3 and 4 are formed which are connected together for access by a connecting door 8. The vertically arranged copy holder 5a forms, with the lens 1 and with the emulsion carrier holder 12, a horizontal optical axis. The lens 1 is movable on an optical bench by means of the adjusting device 14b, and the emulsion carrier holder 12 is movable by means of the adjusting member 14a. In this case, the access door 10 has a window 13 which comprises an exchangeable pane of filter glass and which enables the cabin 3 to be lighted by means of natural daylight. The continuous developer 15, which is let into the cabin wall, here conveys the exposed film directly towards the outside, so that the inconvenience of an unpleasant odor in the cabin is reduced.

The camera parts, such as emulsion carrier holder 12, with adjusting member 14a, the lens 1 with adjusting device 14b, and the pivotable copy holder 5a which is constructed in the form of a suction box, are supported on a central tubular frame 17. Connected to this central tubular frame 17 is the suction side of a blower 16, whose pressure side charges the cabin 3 with air through the partition wall 7. The air is mostly sucked in through the copy holder surface 5. However, a small part of the air is also sucked out of the emulsion carrier holder through the hose 18.

The cabin walls here are formed from wall elements 9, which form flanges at their sides and are screwed together. The copy holder 5a, which is pivotable through the angle $\alpha$, can also be loaded with material to be copied, and unloaded, from outside the cabin 4. In place of the vertical axis of rotation, however, it is also possible to arrange the rotation axis horizontally and to pivot the copy holder out from the cabin 4, in table-like manner.

It is also possible, however, to provide the copy holder 5a (in a manner not shown in the drawing) with guides at the top and at the bottom, thus rendering it slidable parallel to its copy holding surface 5. A holder of this type is of particular advantage in cases where a non-direct illumination of the material to be copied is necessary in addition to the direct illumination 6. Here, in place of the air-permeable copy-holding surface 5a, a glass plate is necessary, with further light sources arranged behind it. In this case, it is very simple to arrange both above-described copy-holding surfaces adjacent to one another, and, by means of lateral sliding, to slide either the glass plate or the suction surface 5 into the position of alignment with the lens 1.

The reduced-scale image is projected from the lens 1 onto an emulsion carrier 2, which is held on the emulsion carrier holder 12 by means of suction. The selection of the scale of reduction is made by varying the distance between emulsion carrier 2 and copy holding surface 5, by means of the adjusting member 14a and of the emulsion carrier holder 12, and the adjusting device 14b of the lens 1. The operator passes through the access door 8 into the interior of the cabin 3, and after the exposure, actuates the continuous developer 15.

By means of the connection of an additional illuminating device 19 the emulsion carrier 12 can also be loaded with material to be copied, if such is to be enlarged, and thus becomes the copy holder. In this case, the light-sensitive emulsion carrier 2 is suctioned onto the surface 5 of the holder 5a which thus becomes the emulsion carrier holder, and is illuminated. The exposed emulsion carrier is then brought through the door 8 to the developer 15, by the operator, in illumination as for a darkroom, and is developed. However, it is also possible to exchange the holder 12, which is constructed as a suction wall, for an image-projector, thus projecting positive and/or negative films onto an emulsion carrier of the surface 5.

I claim:

1. Photocopying apparatus comprising a cabin structure, a light-sealing partition wall dividing said cabin structure into first and second cabins into which an operator can enter, a connecting door in said partition wall to enable an operator to pass between said first and second cabins, a first material holder and first illuminating means for selectively illuminating material on the first holder, said first material holder and said first illuminating means being disposed in said first cabin, and a second material holder, a lens means, and a second illuminating means for selectively illuminating material on the second holder, said second material holder, said lens means and said second illuminating means being disposed in said second cabin, said lens means being positioned intermediate said first and second material holders, said first and second material holders being constructed and arranged to function either as emulsion carriers or copy holders thereby permitting reduction or re-enlargement of the copy by selectively passing the light in the desired direction.

2. Photocopying apparatus according to claim 1 wherein the cabin structure is formed by a plurality of similar wall elements which are connected together at their edges, and detachable connecting means for connecting the wall elements together.

3. Photocopying apparatus according to claim 1 wherein said first material holder has a material holding surface and is mounted pivotably or slidably in such a manner that said material holding surface can be loaded with material from outside said first cabin.

4. Photocopying apparatus according to claim 1 wherein said first material holder has a material holding surface in the form of a suction surface whereby material can be sucked thereonto, the apparatus further comprising means for sucking air away from said surface to suck said material thereonto and means for passing at least part of the sucked-away air into said second cabin for the ventilation thereof.

5. Photocopying apparatus according to claim 1 wherein at least one wall of said cabin is provided with light-filtering window means for safety illumination of the interior of the cabin.

* * * * *

UNITED STATES PATENT OFFICE
CERTIFICATE OF CORRECTION

Patent No. __3,682,545__  Dated __August 8, 1972__

Inventor(s) __GERHARD GRIMM__

It is certified that error appears in the above-identified patent and that said Letters Patent are hereby corrected as shown below:

1) In the heading on page 1 of the patent, item [73] should correctly identify the assignee as follows:

"Fritz Geisenberger, Munich, Germany, 1/2 interest", in accordance with the assignment recorded August 31, 1970, Reel 2641, Frames 158-9.

2) In the heading on page 1 of the patent, item [30], the German priority application number should correctly read "P 19 26 543.1".

3) In the "ABSTRACT", item [57], after line 4, insert "film holder in the usual manner. One room contains the plate or".

Signed and sealed this 8th day of May 1973.

(SEAL)
Attest:

EDWARD M. FLETCHER, JR.
Attesting Officer

ROBERT GOTTSCHALK
Commissioner of Patents